(12) United States Patent
Tanabe et al.

(10) Patent No.: US 7,757,991 B2
(45) Date of Patent: Jul. 20, 2010

(54) HELICOPTER BLADE VORTEX INTERACTION NOISE REDUCING METHOD AND DEVICE

(75) Inventors: Yasutada Tanabe, Tokyo (JP); Takeshi Akasaka, Tokyo (JP); Shigeru Saito, Tokyo (JP); Noboru Kobiki, Tokyo (JP)

(73) Assignees: Kawada Industries, Inc., Tokyo (JP); Japan Aerospace Exploration Agency, Tokyo (JP)

( * ) Notice: Subject to any disclaimer, the term of this patent is extended or adjusted under 35 U.S.C. 154(b) by 1093 days.

(21) Appl. No.: 10/570,082

(22) Filed: Feb. 28, 2006

(65) Prior Publication Data

US 2010/0044505 A9 Feb. 25, 2010

Related U.S. Application Data

(63) Continuation-in-part of application No. PCT/JP03/11098, filed on Aug. 29, 2003.

(51) Int. Cl.
*B64C 3/50* (2006.01)
*B64C 3/54* (2006.01)
*B64C 23/00* (2006.01)

(52) U.S. Cl. .................. 244/1 N; 244/199.3; 244/215; 244/218; 416/24

(58) Field of Classification Search .............. 244/1 N, 244/199.3, 200.1, 201, 204.1, 206, 213, 218, 244/215; 416/24, 23, 87–89
See application file for complete search history.

(56) References Cited

U.S. PATENT DOCUMENTS 1,888,418 A * 11/1932 Adams .................. 244/218
(Continued)

FOREIGN PATENT DOCUMENTS

FR 2 452 426 3/1979
(Continued)

OTHER PUBLICATIONS

Abstract translation of JP2001191995A.*
(Continued)

*Primary Examiner*—Tien Dinh
*Assistant Examiner*—Joseph W Sanderson
(74) *Attorney, Agent, or Firm*—Perkins Coie LLP

(57) ABSTRACT

In a blade vortex interaction (BVI) noise reduction system for a helicopter a rotor blade, a tab is movable via an actuator from a first position, wherein the tab is within the blade, to a second position, wherein the tab extends outwardly from a trailing edge of the rotor blade. The actuator is operated so that the tab advances and retreats in response to rotating timing of the rotor blade, to reduce the BVI noise of the rotor blade.

19 Claims, 18 Drawing Sheets

U.S. PATENT DOCUMENTS

| | | | |
|---|---|---|---|
| 1,893,129 A | | 1/1933 | Charpentier |
| 1,987,050 A | | 1/1935 | Burnelli |
| 5,639,215 A | * | 6/1997 | Yamakawa et al. ............ 416/23 |
| 6,033,180 A | * | 3/2000 | Machida ....................... 416/23 |
| 6,138,957 A | | 10/2000 | Nastasi et al. |
| 6,139,268 A | * | 10/2000 | Murawski et al. ............. 416/23 |
| 6,171,056 B1 | * | 1/2001 | Lorber ......................... 416/42 |
| 6,921,052 B2 | * | 7/2005 | Lawless ....................... 244/201 |
| 6,984,109 B2 | * | 1/2006 | Bagai ............................ 416/1 |
| 2002/0117579 A1 | * | 8/2002 | Kotoulas et al. ............ 244/1 N |

FOREIGN PATENT DOCUMENTS

| | | | |
|---|---|---|---|
| JP | 10-271852 | | 10/1998 |
| JP | 2001191995 A | * | 7/2001 |
| JP | 2001197794 A | * | 7/2001 |
| JP | 2003-306198 | | 10/2003 |

OTHER PUBLICATIONS

International Search Report for International Application No. PCT/JP03/11098, Dated Dec. 16, 2003, 1 page(s).

Translation of PCT International Preliminary Report on Patentability in International Application No. PCT/JP2004/006390.

* cited by examiner

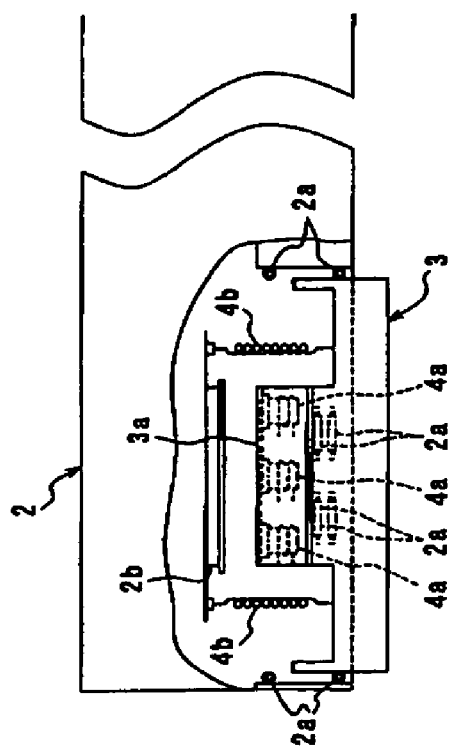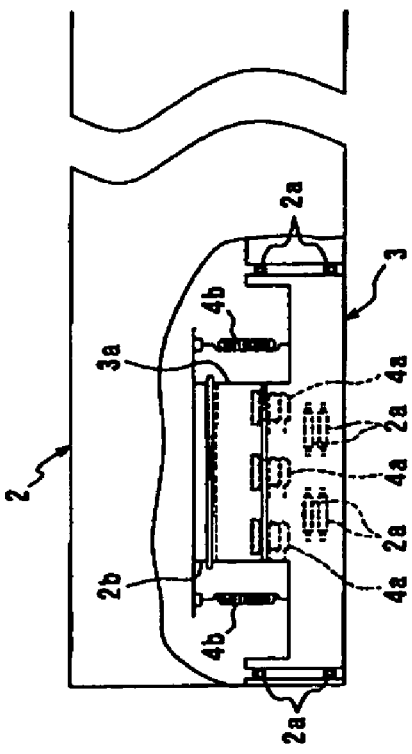

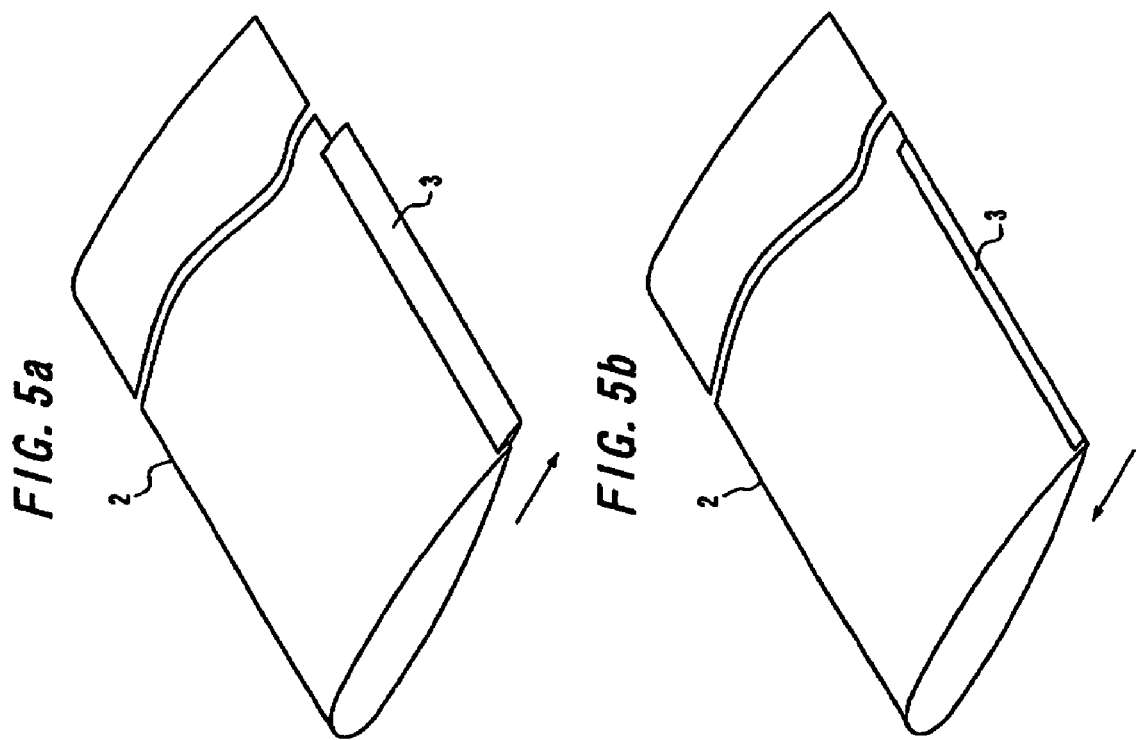

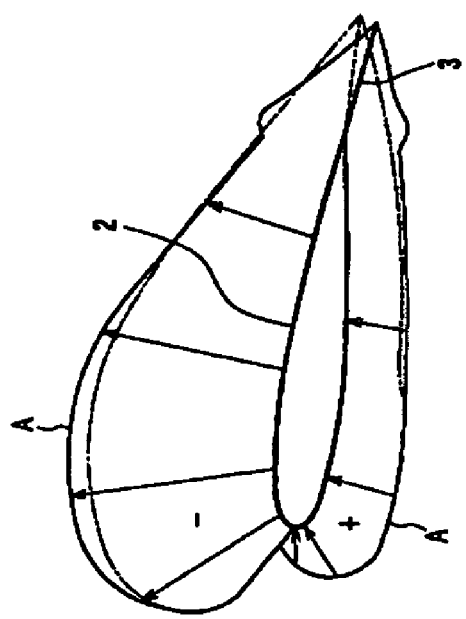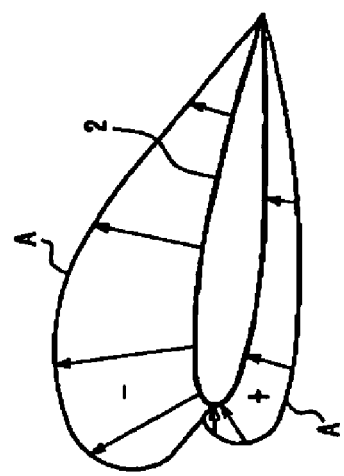

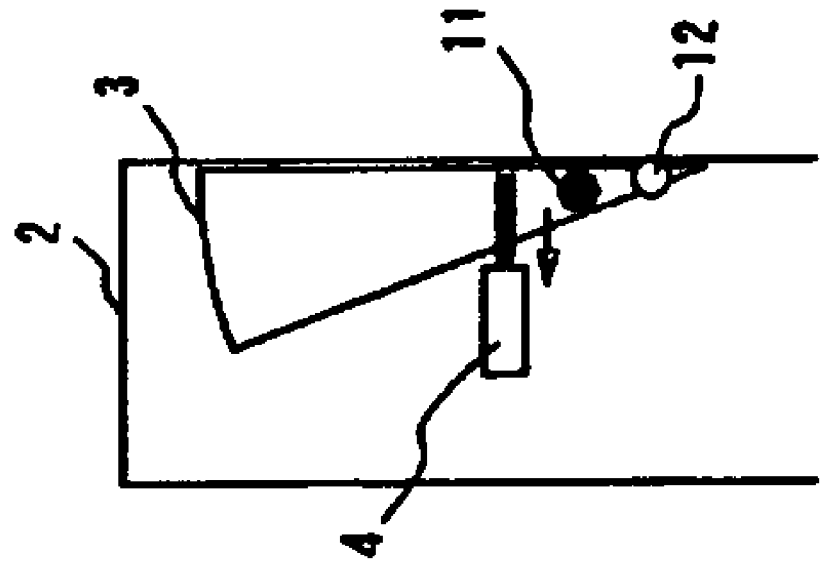
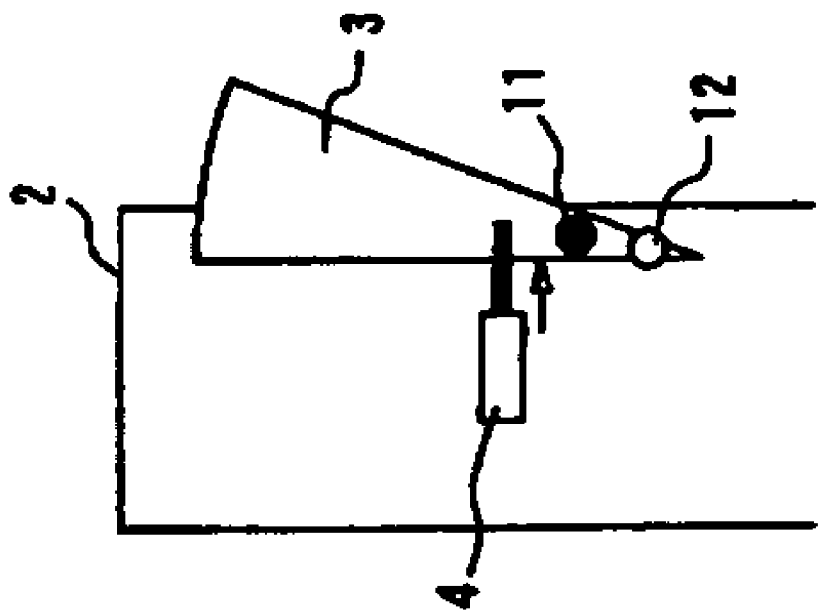

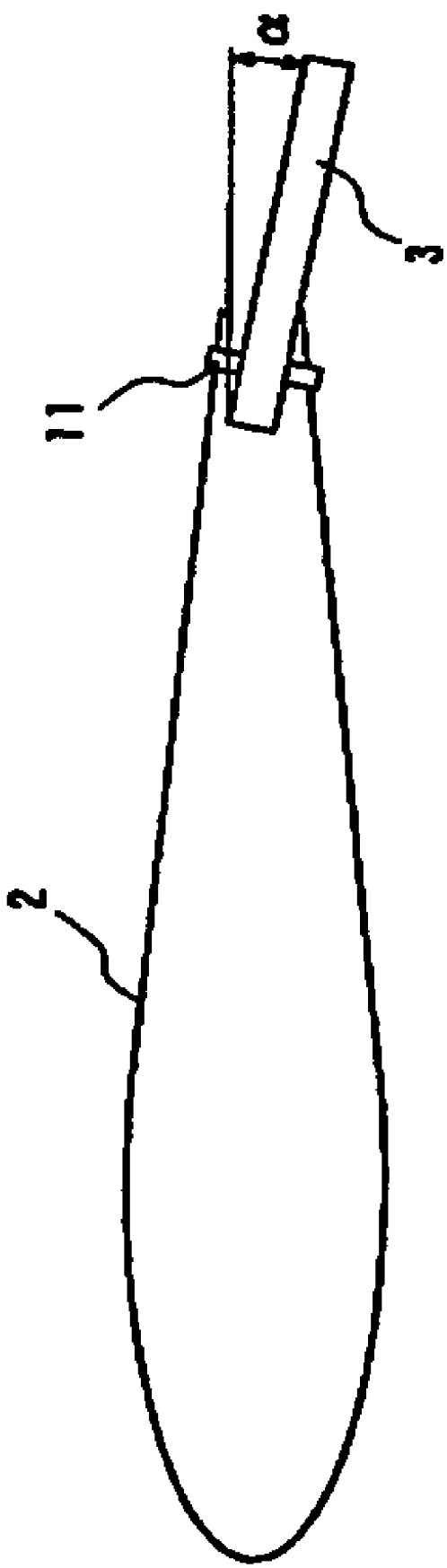

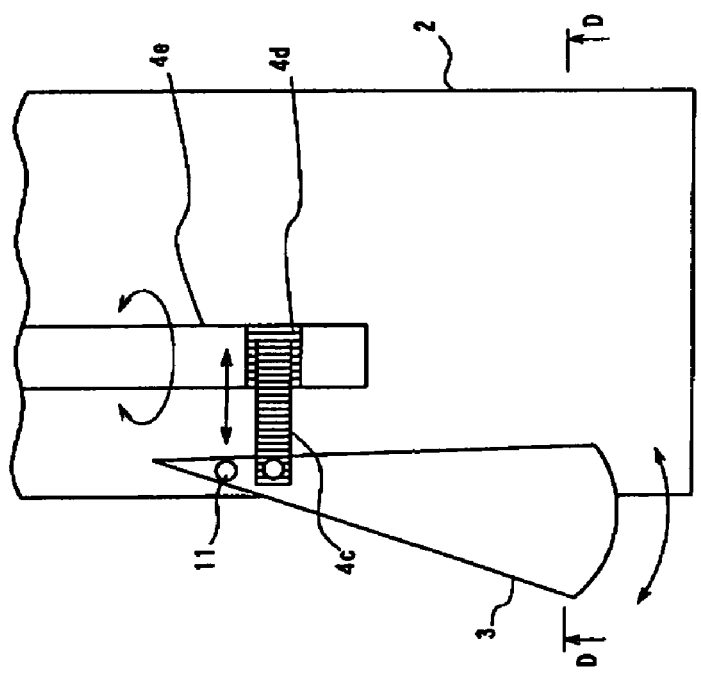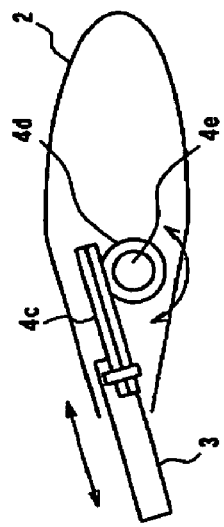
FIG. 12a
FIG. 12b

HELICOPTER BLADE VORTEX INTERACTION NOISE REDUCING METHOD AND DEVICE

This Application is a Continuation-in-Part of International Application No. PCT. JP2003/011098 filed Aug. 29, 2003. The present invention relates to a method and an apparatus that can be used for reducing BVI (Blade Vortex Interaction) noise generated by rotor blades of a helicopter.

FIELD OF THE INVENTION

Background Art

In recent years reduction of a noise of a helicopter is expected, and a method described in Japanese Patent Laid-Open No. 10-271852 bulletin, for example, is known as a measure for the noise reduction. In the technology as described in this bulletin, in order to reduce a noise by decreasing the rotational velocity of a rotor, the aerodynamic characteristic of the rotor blades is improved by providing the trailing edge of the rotor blade with a small flap, whose tilt angle to the rotor blade is controlled precisely by the twist actuator in the rotor blade using a piezoelectric element.

However, the measure using a flap is in practice not so easy, since great control force and high response are required for changing the angle of the flap in the rapidly rotating rotor blade.

Incidentally, none of other noises of a helicopter is as loud as the BVI noise. Reduction of the BVI noise is thus very effective for reducing the whole noise of a helicopter.

The BVI noise is explained below; When lift force is generated by rotations of the rotor system 1 shown by arrow B in FIG. 17 and the helicopter body HB ascends and moves forward, the blade tip vortex BV is generated from the tip of the rotor blade 2. After this blade tip vortex BV draws away from the tip of the rotor blade 2, it drifts downwards and backwards with the rotor slipstream while it proceeds to the center of rotation of the rotor system 1. When the rotor blade 2 following the preceding rotor blade 2 enters into the rotor slipstream containing the blade tip vortex BV generated from the preceding rotor blade 2 illustrated as area C, while pressure at the leading edge of the blade is not very high before entry as in FIG. 18 (*a*) showing positional relationship between the blade tip vortex BV and the rotor blade 2, and FIG. 18(*b*) showing pressure distribution on the top surface of the blade, pressure at the leading edge of the blade at the time of entry goes extremely low, or extremely high according to the timing of entry as in FIG. 19(*a*) showing positional relationship between the blade tip vortex BV and the rotor blade 2, and FIG. 19(*b*) showing pressure distribution on the top surface of the blade, bringing about local fluctuation of pressure distribution on the top surface of the rotor blade 2, which influences the attack angle of the rotor blade 2. This fluctuation of pressure distribution causes an impulsive noise which stands out among other noises. This is the noise called slap noise, or BVI (Blade Vortex Interaction) noise since it is generated by interaction between the blade tip vortex and the rotor blade.

Accordingly, in efforts to reduce the BVI noise in order to reduce the whole noise of a helicopter, the inventors of the present invention reached a point where if the trailing edge section of the rotor blade is provided with a tab, which is put in and out of the trailing edge of the rotor blade, lift force of the rotor blade can be locally changed, and this change moderates interaction between the blade tip vortex and the rotor blade, by strengthening a downdraft current over the entire rotor blade and sweeping downward the blade tip vortex and by locally changing height of the rotor blade, and at the same time an actuator can be configured easily and also high response can be achieved readily since not so big control force is required for advance or retreat of the tab.

DESCRIPTION OF THE INVENTION

The present invention provides a BVI noise reduction method and apparatus that has solved a prior-art problem in view of the information described above and the BVI noise reduction method for a helicopter according to the present invention is characterized by, when reducing the BVI noise of the rotor blade of a helicopter, providing the rotor blade with a tab which can advance or retreat with respect to the rear of the rotating direction between a position where the tab protrudes from a trailing edge of the rotor blade and a position where the tab does not, and also by providing the rotor system including the rotor blade which rotates with respect to a body of the helicopter with an actuator which advances and retreats the tab and operating the actuator so that the tab can advance and retreat in response to the rotating timing of the rotor blade.

In this way, the BVI noise can be reduced by locally changing lift force of the rotor blade and with this change moderating interaction between the blade tip vortex and the rotor blade by means of strengthening a downdraft current over the entire rotor blade and sweeping downward the blade tip vortex and also locally changing height of the rotor blade, because it is possible to advance and retreat the tab provided in the rotor blade, which can advance and retreat with respect to the rear of the rotating direction between a position where the tab protrudes from a trailing edge of the rotor blade and a position where the tab does not, in response to rotating timing of the rotor blade, by operating the actuator in the rotor system including the rotor blade, and thus increasing lift force by advancing the tab to the position where the tab protrudes from the trailing edge of the rotor blade, and also decreasing lift force to the former condition by retreating the tab to the position where the tab does not protrude from the trailing edge of the rotor blade.

Moreover, since not so big control force is required for such advance and retreat of the tab with respect to the rear of the rotating direction from the trailing edge of the rotor blade, the actuator which activates the tab can be configured to be small enough to be set in the rotor system, and at the same time high response of the tab can be achieved easily.

In addition, in an embodiment of the method according to the present invention, a drive shaft included in the rotor system which rotates the rotor blade may be provided with a coil of a generator so that electricity generated from the generator by rotating the drive shaft can be supplied from the coil to the actuator. Thus, it may become unnecessary to provide a mast supporting the drive shaft of the rotor system with a collector ring for power supply to the actuator, and the rotor system may be equipped with an independent noise reduction device. Thus, potential cause for the noise reduction apparatus to break down may be reduced, its reliability increased, and its maintenance check simplified.

Also, in another embodiment of the method according to the present invention, the actuator may be operated to make the tab advance and retreat so that the rotor blade following the preceding rotor blade avoids the blade tip vortex generated form the preceding rotor blade, based on the rotating timing with which the rotor blade following the preceding rotor blade approaches the blade tip vortex generated from the preceding rotor blade and which is detected from a phase of the electric power generated from the generator. Thus, by utilizing the generator for power supply to the actuator, lift force of the rotor blade may be changed locally and interaction between the blade tip vortex and the rotor blade may be moderated inexpensively and easily.

Furthermore, in another embodiment of the method according to the present invention, excrescence quantity of the tab may be controlled based on an output signal from a pressure sensor provided in a leading edge of the rotor blade. Thus, because it may become possible to detect whether the blade tip vortex can actually be avoided or not by the output signal from the pressure sensor, interaction between the blade tip vortex and the rotor blade may be moderated more reliably.

And, in another embodiment of the method according to the present invention, the rotor blade may be provided with the tab so that the tab can swing around a specified axis between a position where the tab protrudes from the trailing edge of the rotor blade and a position where the tab does not and can advance and retreat with respect to the rear of the rotating direction of the rotor blade. Thus, it may become possible to make a support structure of the tab a simple swinging type and by doing so restrain weight of the rotor blade and increase of the cost.

Now, a BVI noise reduction apparatus for a helicopter according to the present invention is an apparatus to reduce the BVI noise of the rotor blade of a helicopter characterized by including a tab provided in the rotor blade, which can advance and retreat with respect to the rear of the rotating direction of the rotor blade between a position where the tab protrudes from a trailing edge of the rotor blade and a position where the tab does not, and an actuator which is provided in a rotor system which includes the rotor blade and rotates with respect to a body of the helicopter and which advances and retreats the tab, and a control device which is provided in the rotor system and operates the actuator so that the tab advances and retreats in response to rotating timing of the rotor blade.

In the apparatus according to the present invention, the actuator provided in the rotor system including the rotor blade, advances and retreats the tab provided in the rotor blade, with respect to rear of rotating direction of the rotor blade, between a position where the tab protrudes from the trailing edge of the rotor blade and a position where the tab does not, and the control device, which is also provided in the rotor system, operates the actuator so that the tab advances and retreats in response to rotating timing of the rotor blade.

Thus, in the apparatus according to the present invention, lift force of the rotor blade can be increased by the tab advancing to a position where the tab protrudes from a trailing edge of the rotor blade and can be decreased to the former condition by the tab retreating to a position where the tab does not protrude from the trailing edge of the rotor blade. Therefore, when the rotor blade reaches the position of the blade tip vortex, lift force of the rotor blade is changed locally, and at the same time pressure in the vicinity of a leading edge of the rotor blade is changed instantly, moderating interaction between the blade tip vortex and the rotor blade, and thus successfully reducing the BVI noise.

In addition, because not so big control force is required for such advance and retreat of the tab with respect to the rear of the rotating direction from a trailing edge of the rotor blade, the actuator, which activates the tab, can be configured easily to be small enough to be set in the rotor system, readily making high response of the tab possible.

Moreover, an embodiment of the apparatus according to the present invention may include a generator which has a coil provided in a drive shaft which is included in the rotor system and rotates the rotor blade, and which supplies electric power generated by the rotating drive shaft, from the coil to the actuator. Such configuration enables to equip the rotor system with an independent noise reduction device and enables to make it unnecessary to provide the mast supporting the drive shaft of the rotor system with a collector ring for supplying electricity to the actuator, and thus potential cause for the noise reduction apparatus to break down may be reduced, its reliability increased, and its maintenance check simplified.

In addition, in another embodiment of the apparatus according to the present invention, the actuator may advance and retreat the tab with an electromagnet for pushing out the tab and a spring for pulling back the tab. Such configuration enables to secure maneuverability of a typical helicopter, for even if electric power supply to the actuator or the electromagnet for pushing out the tab is stopped, the spring for pulling back the tab pulls back the tab to a position where the tab does not protrude from a trailing edge of the rotor blade. Furthermore, in another embodiment of the apparatus according to the present invention, the tab may be positioned at a leading edge of the rotor blade. With such configuration even a slightest advance or retreat of the tab can make the rotor blade go up and down, and a lighter and smaller actuator can be used, since the tab is positioned at the highest part of the circumferential direction velocity of the rotor blade.

Further, in another embodiment of the apparatus according to the present invention, the tab may be provided in the rotor blade so that it will swing around a specified axis between a position where the tab protrudes from a trailing edge of the rotor blade and a position where the tab does not and is able to advance and retreat with respect to the rear of the rotating direction of the rotor blade. Such configuration enables to make the support structure of the tab a simple swinging type and by doing so restrain weight of the rotor blade and increase of the cost.

In another embodiment of the apparatus according to the present invention, the tab may be fan-shaped, and may be positioned at the rotor blade in such direction that the tab becomes wider as the tab gets closer to a tip of the rotor blade, and also a narrower part in the vicinity of the pivot part of the fan-shaped tab may be secured to the rotor blade with an axis. With such configuration the rotating direction velocity, in other words circumferential velocity, becomes higher as it gets closer to the tip of the rotor blade, and the tab can be exposed to air current at higher rotating direction velocity to obtain more air force, and eventually the BVI noise can be reduced effectively.

In another embodiment of the apparatus according to the present invention, the actuator may add driving force for the tab to advance and retreat at the vicinity of the pivot part. Such configuration, since it adds driving force for the tab to advance and retreat at the vicinity of the pivot part of the tab, enables to make operation stroke of the actuator small and make the actuator more compact, and also enables to reduce load on the actuator, since the actuator is further away from the tip of the rotor blade and can be operated at a position where centrifugal force is smaller.

Further, in another embodiment of the apparatus according to the present invention, the tab may be provided with a counterweight at the part where the tab is narrower than at the pivot part. Such configuration enables to moderate or offset an element of centrifugal force on the tab around the axis supporting the tab resulting from the rotating rotor blade, by an element of centrifugal force on the counterweight around the axis supporting the tab, and enables to reduce stiffness of the tab support structure and of the movable part of the actuator, and thus enables to reduce load on the actuator.

Furthermore, in another embodiment of the apparatus according to the present invention, the tab may be pivoted to the rotor blade so that the tab can swing around the supporting axis, which slants such way that the supporting axis gets closer to the rear of the rotor blade as the supporting axis gets more upward or downward in the up-and-down direction of the rotor blade. Such configuration enables to give the tab a projecting angle other than 0 degree off the horizontal direction of the rotor blade, and more air force can be obtained with the camber effect, and consequently can reduce the BVI noise effectively.

And, in an embodiment of the apparatus according to the present invention, the actuator may have a rack coupled with the tab; a transmission shaft which includes a pinion engaged into the rack, and which extends from a base to a tip of the rotor blade and is supported by the rotor blade pivotably; and a linkage which is provided in the rotor system and functions as the control device, and in conjunction with, for example, a swash plate, rotates the transmission shaft so that the tab advances and retreats in response to rotating timing of the rotor blade. Such configuration enables to make it unnecessary to have an electrical system in the control device and thus enables to make the configuration of the BVI noise reduction apparatus extremely simple.

BRIEF DESCRIPTION OF THE DRAWINGS

FIG. 2 (a) and FIG. 2 (b) are illustrations showing the state in which the tab of the BVI noise reduction apparatus of the embodiment described above advances and the state in which the tab retreats, respectively, as viewed in a plane view with a part of the top surface of the rotor blade lacking.

FIG. 5 (a) and FIG. 5 (b) are illustrations showing the state in which the tab of the BVI noise reduction apparatus of the embodiment described above advances and the state in which the tab retreats, respectively, as shown in a perspective view of the rotor blade.

FIG. 6 (a) and FIG. 6 (b) are illustrations showing pressure distribution around the rotor blade in the state in which the tab of the BVI noise reduction apparatus of the embodiment described above advances and the state in which the tab retreats, respectively.

FIG. 8 (a) and FIG. 8 (b) are schematic illustrations showing the states in which the tab of the BVI noise reduction apparatus of another embodiment advances and retreats, respectively, as shown in the top view of the rotor blade.

FIG. 9 is an illustration showing the tab of the BVI noise reduction apparatus of the embodiment described above, as shown in a cross-sectional view of the rotor blade.

FIG. 12 (a) is a schematic illustration showing the state in which the tab of the BVI noise reduction apparatus of one variation of the embodiment described above advances, as shown in the top view of the rotor blade, and FIG. 12 (b) is a cross-sectional view of the rotor blade taken along line D-D of FIG. 12 (a).

BEST MODE FOR CARRYING OUT THE INVENTION

Figure 1:
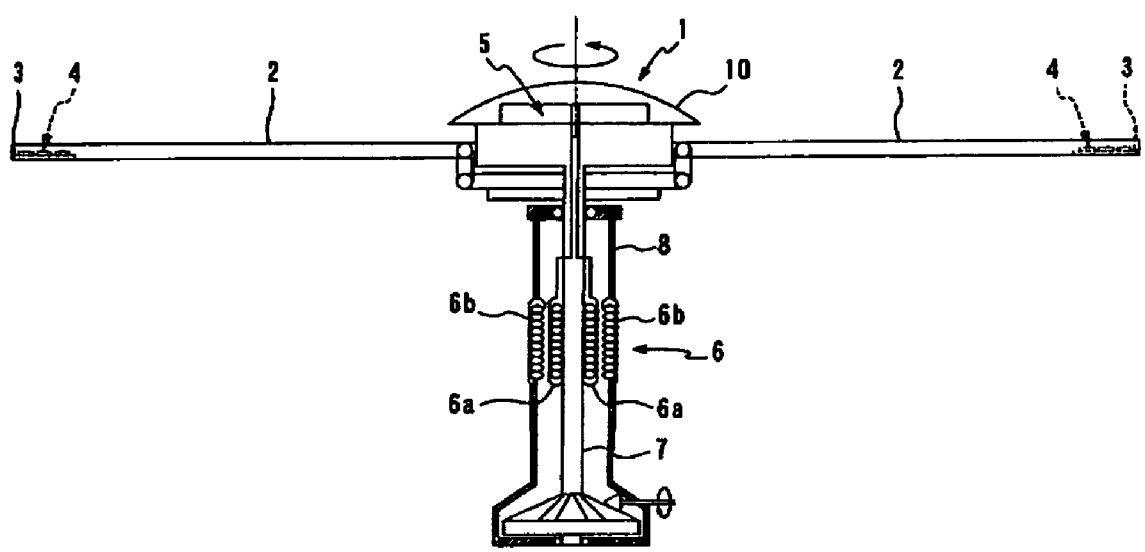
FIG. 1 is a schematic diagram showing configuration of one embodiment of the BVI noise reduction apparatus for helicopters according to the present invention, as shown in a side view of the rotor system.

The present invention will be further described with reference to preferred embodiments shown in the accompanying drawings. Now, FIG. 1 is a schematic diagram showing configuration of one embodiment of the BVI noise reduction apparatus for helicopters according to the present invention, as shown in a side view of the rotor system. FIG. 2 (a) and FIG. 2 (b) are illustrations showing the state in which the tab of the BVI noise reduction apparatus of the embodiment advances and the state in which the tab retreats, respectively, as viewed in a plane view with a part of the top surface of the rotor blade lacking. FIG. 3 (a) and FIG. 3 (b) are illustrations showing the state in which the tab of the BVI noise reduction apparatus of the embodiment advances and the state in which the tab retreats, respectively, as shown in a cross-sectional view of the rotor blade. FIG. 4 is a constituent drawing showing the generator and the control device of the BVI noise reduction apparatus of the embodiment, with the actuator. FIG. 5 (a) and FIG. 5 (b) are illustrations showing the state in which the tab of the BVI noise reduction apparatus of the embodiment advances and the state in which the tab retreats, respectively, as shown in a perspective view of the rotor blade. FIG. 6 (a) and FIG. 6 (b) are illustrations showing pressure distribution around the rotor blade in the state in which the tab of the BVI noise reduction apparatus of the embodiment described above advances and the state in which the tab retreats, respectively.

Figure 3A:
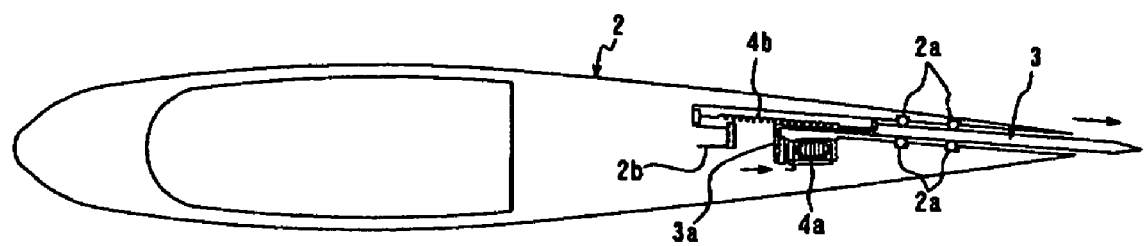
FIG. 3 (a) and FIG. 3 (b) are illustrations showing the state in which the tab of the BVI noise reduction apparatus of the embodiment described above advances and the state in which the tab retreats, respectively, as shown in a cross-sectional view of the rotor blade.
Figure 3B:
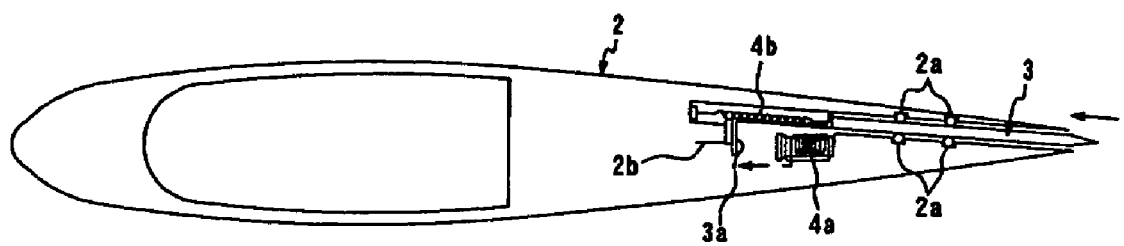
Figure 4:
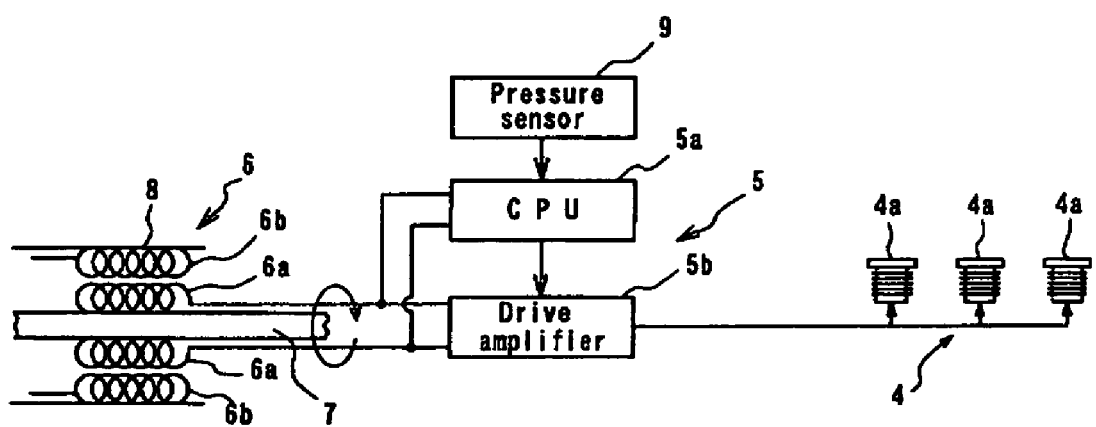
FIG. 4 is a constituent drawing showing the generator and the control device of the BVI noise reduction apparatus of the embodiment described above, with the actuator.

As shown in FIG. 1 to FIG. 3, the BVI noise reduction apparatus of this embodiment includes a small tabular tab 3, which is disposed at each of trailing edges of the rotor blades 2 included in the rotor system 1 rotating with respect to a not-illustrated body of the helicopter. The tab is generally parallel to the top surface of a trailing edge of the rotor blade 2 and also in longitudinal direction of the rotor blade 2, slightly backward slanting from a traverse plane through a leading edge and a trailing edge of the rotor blade 2 dividing the rotor blade into top and bottom sections, so that the tab extends the trailing edge of the rotor blade 2 to the rear. The tab 3 is fastened by rollers 2a from top and bottom and from right and left, the tab 3 can advance and retreat between a position where the tab protrudes from the trailing edge of the rotor blade 2 as shown in FIG. 2 (a) and FIG. 3(a) and a position where the tab does not protrude from the trailing edge as shown in FIG. 2 (b) and FIG. 3 (b), with respect to the rear of the rotating direction of the rotor blade 2.

In addition, the BVI noise reduction apparatus of this embodiment is disposed in each of the rotor blades 2, and includes an actuator 4, which advances and retreats the tab 3 between a position where the tab protrudes from the trailing edge of the rotor blade 2 as shown in FIG. 2 (a) and in FIG. 3 (a) and a position where the tab does not protrude from the trailing edge of the rotor blade 2 as shown in FIG. 2(b) and in FIG. 3 (b), with respect to the rear of the rotating direction of the rotor blade 2.

As shown in FIG. 2 and FIG. 3, the actuator 4, which is disposed in the rotor blade 2, comprises the electromagnets 4a for pushing out the tab, each of which is pivoted to a trailing edge section of the tab 3 (a left edge section in FIG. 3) and electromagnetically attracting a steel plate 3a with its tip folded downward and springs 4b for pulling back the tab 3, which are also disposed in the rotor blade 2 and which continuously bias the tab toward a leading edge of the rotor blade 2 by pulling the trailing edge section of the tab 3. When all the electromagnets 4a for pushing out the tab are supplied with power, the electromagnets 4a for pushing out the tab electromagnetically attract the steel plate 3 against the spring 4b for pulling back the tab to advance the tab 3 to a position where the tab protrudes from the trailing edge of the rotor blade 2, as shown in FIG. 2 (a), FIG. 3 (a), and FIG. 5 (a). Also, when power supply to all the electromagnets 4a for pushing out the tab is stopped, the springs 4b for pulling back the tab, by their elasticity, retreat the tab 3 to a position where the tab does not protrude from the trailing edge of the rotor blade 2, as shown in FIG. 2 (b), FIG. 3 (b), and FIG. 5 (b). In addition, 2b in the figures indicates a stopper which is adjacent to the steel plate 3a and determines the position where the tab retreats the most, which is a position where the tab does not protrude from the trailing edge of the rotor blade 2.

Furthermore, the BVI noise reduction apparatus of this embodiment, as shown in FIG. 4, includes a control device 5 which operates the actuator 4 so that the tab advances and retreats in response to rotating timing of the rotor blade 2 and a generator 6 which supplies power to the control device 5 and the actuator 4. The generator 6 has rotor coils 6a disposed in a drive shaft 7 which is included in the rotor system 1 and rotates the rotor blade 2 and stator coils 6b disposed in a mast 8 supporting the drive shaft rotatably, and supplies from the rotor coils 6a to the control device 5 electricity generated from energization to the stator coils 6b and from rotation of the rotor coils 6a accompanied by rotation of the drive shaft 7.

In addition, the BVI noise reduction apparatus of this embodiment includes a pressure sensor 9 (see FIG. 4) built in a position in longitudinal direction corresponding to the position of the tab 3 in a leading edge of each of the rotor blades 2 (a left end edge in FIG. 3). In addition, in this embodiment, the tab 3 and the pressure sensor 9 are disposed at a tip of the rotor blade 2 in longitudinal direction, which is at the highest part of the circumferential direction velocity of the rotor blade 2.

Further, the control device 5, as shown in FIG. 1, is disposed in a faring 10 which is dome-shaped and secured to the upper end section of the drive shaft 7, and also as shown in FIG. 4, has a CPU (Central Processing Unit) 5a, a drive amplifier 5b and a not-illustrated memory which controls the operation of the CPU 5a. The CPU 5a is supplied power from the rotor coils 6a of the generator 6 to operate, detects the rotating position of each of the rotor blades 2 from the phase of electric power from the rotor coils 6a to a body of the helicopter, inputs a signal output by the pressure sensor 9 detecting pressure around the leading edge of the rotor blade 2, outputs a drive signal to moderate interaction between the blade tip vortex and the rotor blade by changing locally lift force of each of the rotor blades 2, exactly when each of the rotor blades 2 reaches the rotating position where it interacts with the blade tip vortex of another rotor blade 2 in front of the rotating direction. The drive amplifier 5b is supplied power from the rotor coils 6a of the generator 6 to operate and supplies drive power which is amplified from drive signals from the CPU 5a, to the electromagnets 4a of the actuator 4. In addition, the control device 5 has a not-illustrated battery for backup in the fairing 10 in order to keep data in the memory even when the drive shaft is not rotating.

In one embodiment of this BVI noise reduction apparatus, the actuator 4 built in the rotor blade 2 constituting the rotor system 1 advances and retreats the tab 3 set in the trailing edge section of the rotor blade 2, between a position where the tab protrudes from the trailing edge of the rotor blade 2 and a position where the tab does not protrude, generally parallel to the top surface of the rotor blade 2. And the control device 5 in the fairing 10 secured to the upper end section of the drive shaft 7 constituting the rotor system 1 operates each of the actuators 4 so that each of the tabs 3 advances and retreats in response to the rotating timing of each of the rotor blades 2.

Therefore, the BVI noise reduction method and apparatus of this embodiment, advances each of the tabs 3 from a trailing edge of the rotor blade 2 to the rear exactly when each of the rotor blades 2 reaches the rotating position where it interacts with the blade tip vortex of another rotor blade 2 in front of the rotating direction and by doing so locally increases lift force of the rotor blade 2 compared to when the tab 3 in FIG. 6 (b) has retreated, as Line A in FIG. 6(a) shows pressure distribution with + as positive pressure and − as negative pressure, and changes instantly pressure around a leading edge of the rotor blade 2. The increased lift force and changed pressure cause such torsion on the rotor blade that the attack angle increases along the entire rotor blade. This strengthens a downdraft current (down wash) over the entire rotor blade, sweeps downward the blade tip vortex and also locally changes height of the rotor blade. Thus, interaction between the blade tip vortex and the rotor blade 2 can be moderated and the BVI noise can be reduced.

In addition, because not so much control force is required for such advance and retreat of the tab 3 from a trailing edge of the rotor blade 2 with respect to the rear of the rotating direction, the actuator 4 to operate the tab 3 can be easily configured to be small enough to be set in the rotor system, especially in the rotor blade 2, and also high response of the tab 3 can be achieved readily.

Furthermore, the BVI noise reduction method and apparatus of this embodiment includes the generator 6 which has the rotor coils 6a provided in the drive shaft 7 which is included in the rotor system 1 and rotates the rotor blade 2 and which supplies electric power generated from the rotating drive shaft 7 from the rotor coils 6a to the actuator 4. Therefore, it is unnecessary to provide the mast 8 supporting the drive shaft 7 with a collector ring for supplying electricity to the actuator 4, and the rotor system can be equipped with an independent noise reduction device. Thus, potential cause for the noise reduction apparatus to break down may be reduced, its reliability increased, and its maintenance check simplified.

In addition, in the BVI noise reduction method and apparatus of this embodiment, the tab 3 can automatically spring back to the neutral position with elasticity of the springs 4b. Thus, maneuverability of a typical helicopter can be secured.

Additionally, in the BVI noise reduction method and apparatus of this embodiment, the tab 3 disposed at the tip of the rotor blade 2 in longitudinal direction is placed at the highest part of the circumferential direction velocity of the rotor blade 2. Therefore, even a slightest advance or retreat of the tab can make the rotor blade go up and down, the actuator 4 can be lighter and smaller.

Further, according to the BVI noise reduction method and apparatus of this embodiment, the tab 3 provided in a trailing edge section of the rotor blade 3 advances and retreats between a position where the tab protrudes from the trailing edge and a position where the tab does not, generally parallel to the top surface of the rotor blade 2, with respect to the rear of the rotating direction of the rotor blade 2. Therefore, as pressure distribution is shown in FIG. 6 (a) by solid line, bigger lift force can be achieved, compared to the case (as shown by phantom line in the figure) in which the tab protrudes parallel to a traverse plane through the leading edge and the trailing edge of the rotor blade 2 dividing the rotor blade into top and bottom sections.

In addition, according to the BVI noise reduction method and apparatus of this embodiment, lift force can be controlled with more appropriate timing, because undesired adverse lift force of the initial stage operation (lift force which is generated until the vortex by a spoiler reaches a trailing edge of the rotor blade) is not generated, compared to the case in which lift force of the rotor blade is controlled by a spoiler protruding from top and bottom surfaces of the rotor blade, for example.

Figure 7A:
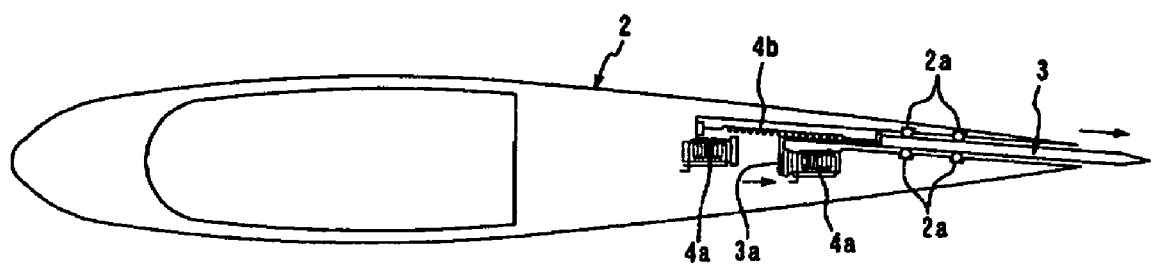
FIG. 7 (a) and FIG. 7 (b) are illustrations showing the state in which the tab of the BVI noise reduction apparatus of one variation of the embodiment described above advances and the state in which the tab retreats, respectively, as shown in a cross-sectional view of the rotor blade.
Figure 7B:
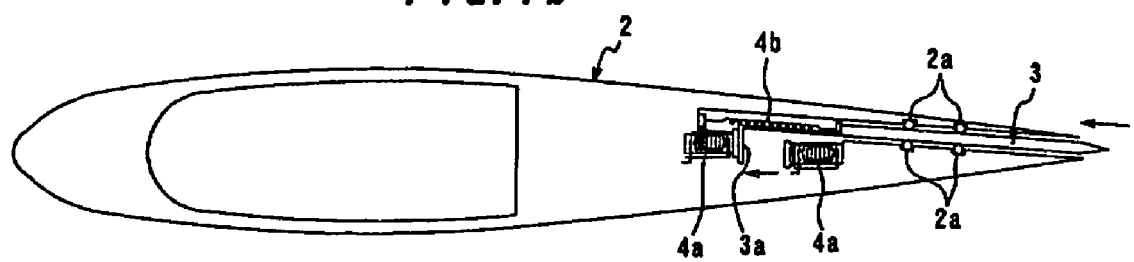

FIG. 7 illustrates one variation of the BVI noise reduction apparatus of the embodiment described above. In this embodiment, the actuator 4 also has the electromagnets 4a for pulling back the tab 3. According to such variation, the tab 3 can be operated more rapidly, and high response of the tab 3 can be achieved more easily.

FIG. 8 (a) and FIG. 8 (b) are schematic illustrations showing the states in which the tab of the BVI noise reduction apparatus of another embodiment advances and retreats, respectively, as shown in the top view of the rotor blade. FIG. 9 is an illustration showing the tab of the BVI noise reduction apparatus of the embodiment described above, as shown in a cross-sectional view of the rotor blade. The same parts of the embodiment above are referred to as the same signs.

Thus, according to the BVI noise reduction apparatus of this embodiment, the tab 3 is provided in the rotor blade 2 to swing around the central axis of the supporting axis 11 between the position shown in FIG. 8 (a) where the tab protrudes from a trailing edge of the rotor blade 2 and the position shown in FIG. 8 (b) where the tab does not, and advances and retreats with respect to the rear of the rotating direction. The tab 3 is fan-shaped and is positioned at the rotor blade 2 in such direction that the tab becomes wider as the tab gets closer to a tip of the rotor blade 2 (the upper end in FIG. 8), and also a narrower part in the vicinity of the pivot of the fan is secured to the rotor blade 2 by the supporting axis 11.

In addition, according to the BVI noise reduction apparatus of this embodiment, a counterweight 12 is provided in the part of the tab 3 which is narrower than the supporting axis 11. The actuator 4, which is made from electromagnetic solenoid with an electromagnet, for example, as well as in the other embodiments above, is disposed to add driving force for the tab 3 to advance and retreat at the vicinity of the supporting axis 11.

Further, the BVI noise reduction apparatus of this embodiment, as shown in FIG. 9, the supporting axis 11 slants such way that the supporting axis gets closer to the rear of the rotor blade as the supporting axis gets more upward or downward in up-and-down direction of the rotor blade. The tab 3 is pivoted to the rotor blade 2 to swing around the supporting axis 11. In points other than these the apparatus is configured to be the same as the other embodiments described above.

According to such configuration of these embodiments, as well as the other embodiments described above, the BVI noise can be reduced, the support structure of the tab 3 can be a simple swinging type, and also weight of the rotor blade and increase of the cost can be restrained. Also, because the tab 3 is fan-shaped and positioned at the rotor blade 2 in such direction that the tab becomes wider as the tab gets closer to the tip of the rotor blade 2, and a narrower part in the vicinity of the pivot of the fan is pivoted to the rotor blade 2, the rotating direction velocity, in other words circumferential velocity, becomes higher as it gets closer to the tip of the rotor blade, and the tab is exposed to air current at higher rotating direction velocity to obtain more air force, and eventually the BVI noise can be reduced more effectively.

Figure 10:
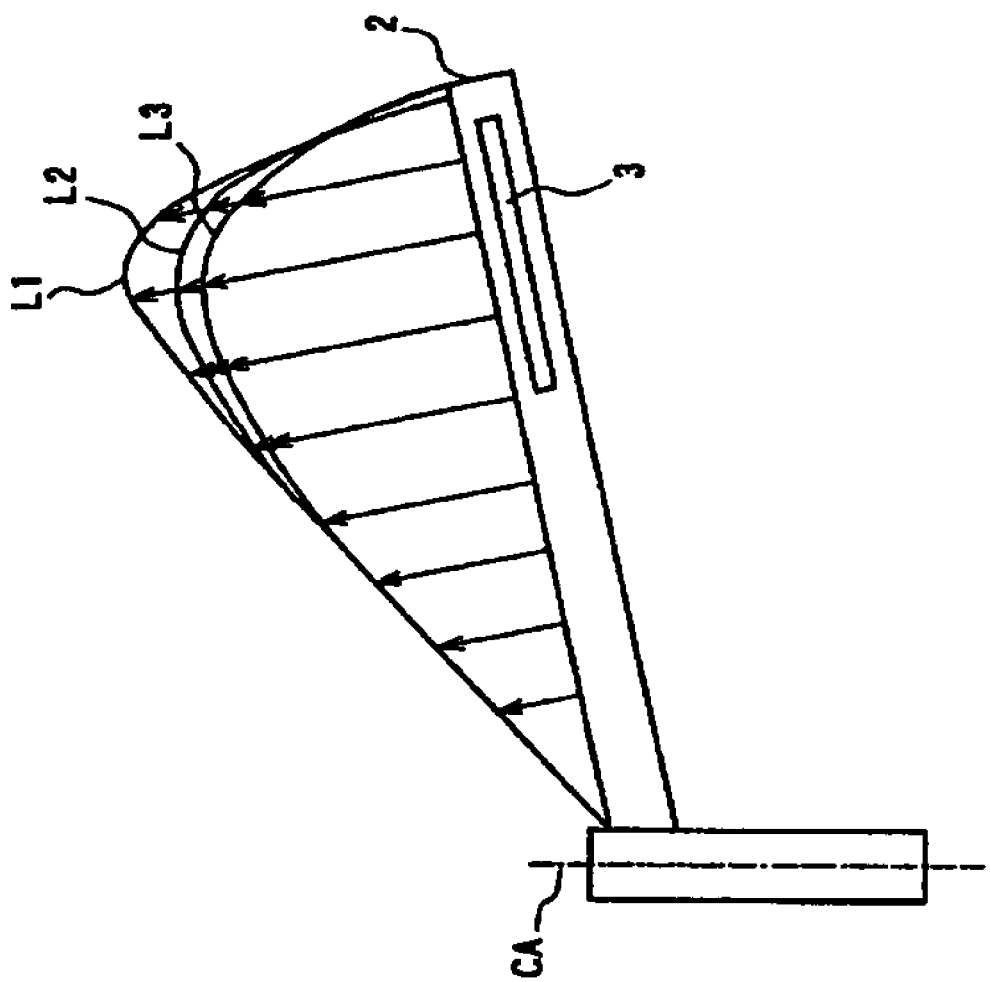
FIG. 10 is an illustration showing pressure distribution around the rotor blade in the state in which the tab of the BVI noise reduction apparatus of the embodiment described above is advanced, compared with the case of the tab of the former embodiment and with the case where there is no such tab.

Now, FIG. 10 is an illustration showing pressure distribution around the rotor blade L1 in the state in which the tab of the BVI noise reduction apparatus of the embodiment described above is advanced, compared with pressure distribution L2 in the case of the tab of the former embodiment and with pressure distribution in the case where there is no such tab. It is clear from this figure too that the BVI noise reduction apparatus of this embodiment can more effectively reduce the BVI noise.

However, because a blade tip vortex is generated in the descending current around a tip, an attack angle of the rotor blade is relatively small. Therefore, a position where lift force can be obtained effectively is a position which is a little closer to the base than the tip, as seen in the pressure distribution of FIG. 10.

Further, according to the apparatus of this embodiment, the actuator 4 adds driving force for the tab 3 to advance and retreat at the vicinity of the supporting axis of the tab 3. So, operation stroke of the actuator 4 can be small and the actuator 4 can be more compact. Also, since it is further away from a tip of the rotor blade 2, the actuator 4 can be operated at a position where centrifugal force is smaller, and load on the actuator 4 can be reduced.

Further, according to the apparatus of this embodiment, the tab 3 is pivoted to the rotor blade 2 to swing around the supporting axis 11 which slants such way that the supporting axis gets closer to the rear of the rotor blade as the supporting axis gets more upward in up-and-down direction of the rotor blade. So, the tab 3 can have a projecting angle other than 0 degree off the horizontal direction of the rotor blade, and more air force can be obtained with the camber effect, and consequently the BVI noise can be reduced effectively.

Figure 11A:
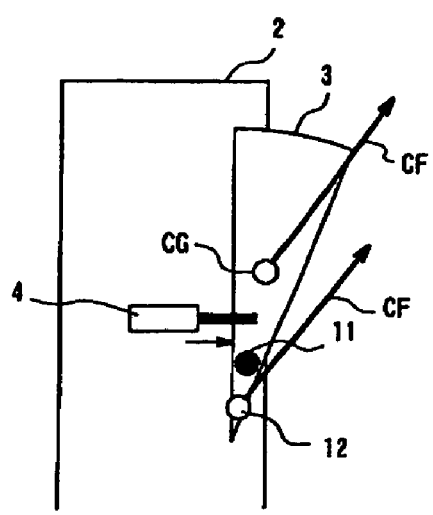
FIG. 11 (a) and FIG. 11 (b) is an illustration showing effect of centrifugal force in the state in which the tab of the BVI noise reduction apparatus of the embodiment described above is advanced.
Figure 11B:
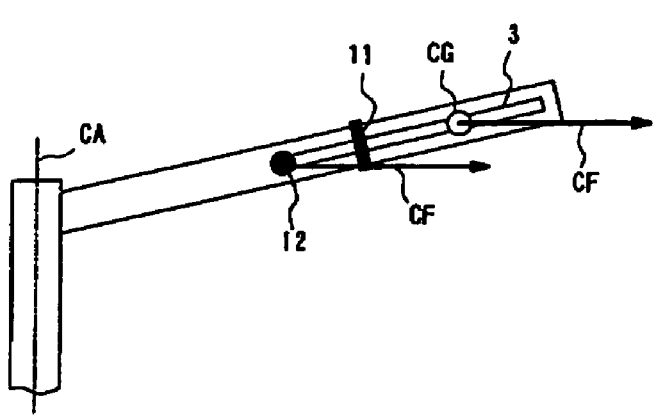

Furthermore, according to the apparatus of this embodiment, a counterweight is provided at the part of the tab 3 where the tab is narrower than at the part pivoted by the supporting axis 11. So, as seen in FIG. 11, an element of centrifugal force CF given to the counterweight 12 around the central axis of the supporting axis 11 can moderate or offset an element of centrifugal force CF given by the rotating rotor blade 2 to the centroid CG of the tab 3 around the supporting axis 11. Also, stiffness of the supporting axis 11 and of the structure around it and of the movable part of the actuator can be reduced and load on the actuator also can be reduced.

FIG. 12 (*a*) is a schematic illustration showing the state in which the tab of the BVI noise reduction apparatus of one variation of the embodiment described above is advanced, as shown in the top view of the rotor blade. FIG. 12 (*b*) is a cross-sectional view of the rotor blade taken along D-D of FIG. 12 (*a*). According to the BVI noise reduction apparatus of this variation, the actuator 4 has a rack 4*c* coupled into the tab 3 by a pin to swing and a transmission shaft 4*e* which includes a pinion 4*d* engaged into the rack 4*c* and also which extends in longitudinal direction of the rotor blade 2 and which is pivoted by the rotor blade and also has, for example, a motor which turns the transmission shaft 4*e*. The apparatus of this embodiment is different from the other embodiments in these respects, and configured to be the same as the others in other respects.

According to the BVI noise reduction apparatus of this variation, a motor, for example, which turns the transmission shaft 4*e* of the actuator 4, can be operated at a position where centrifugal force is smaller and load on the actuator 4 can be reduced, because it is further away from the tip of the rotor blade 2.

Figure 13:
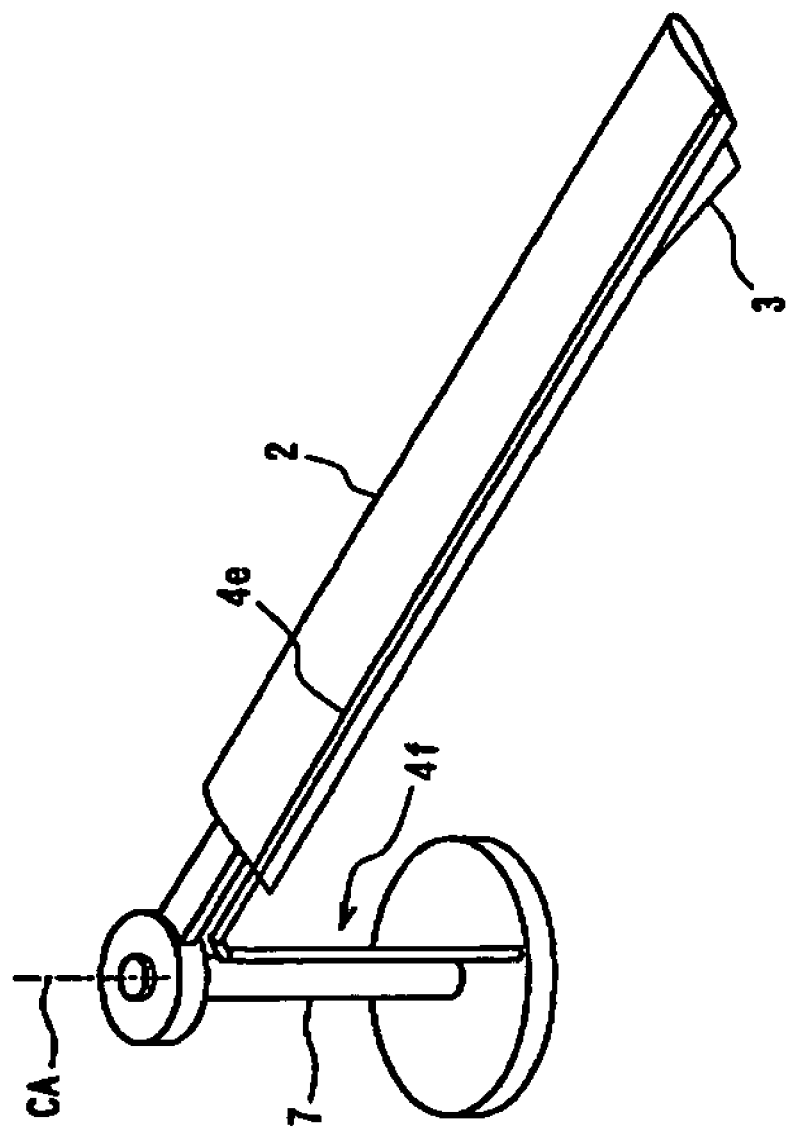
FIG. 13 is a perspective view of configuration of the actuator of yet another embodiment of the BVI noise reduction apparatus according to the present invention.
Figure 14:
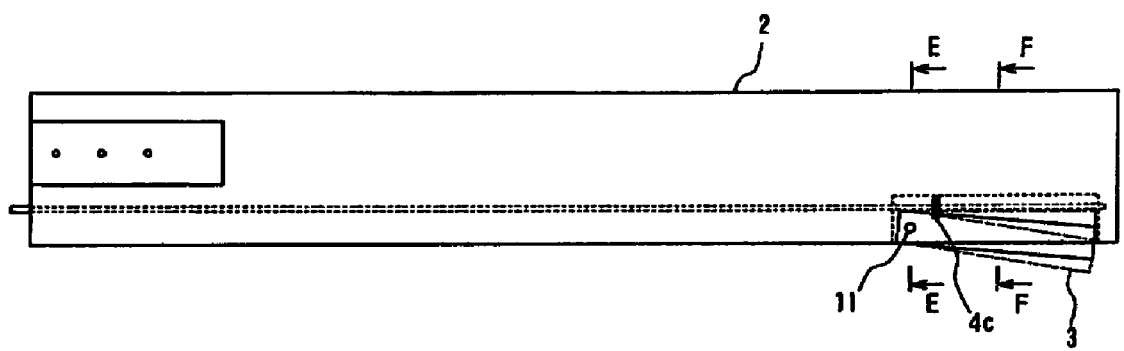
FIG. 14 is a plane view showing configuration of the BVI noise reduction apparatus of the embodiment described above.
Figure 15:
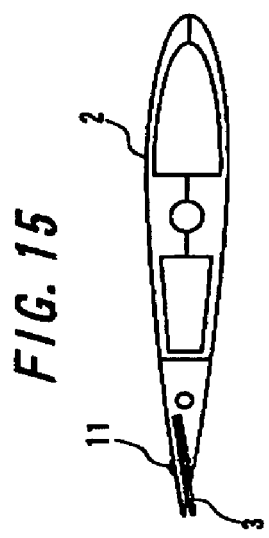
FIG. 15 is a cross-sectional view of the rotor blade taken along line E-E of FIG. 14.
Figure 16A:
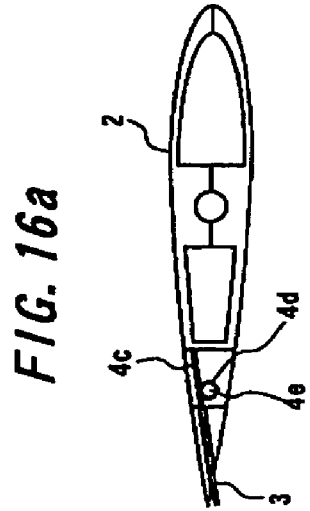
FIG. 16 (a) is a cross-sectional view of the rotor blade taken along line F-F of FIG. 14 in the state in which the tab retreats the most, and FIG. 16 (b) is a cross-sectional view of the rotor blade taken along line F-P of FIG. 14 in the state in which the tab advances the most.
Figure 16B:
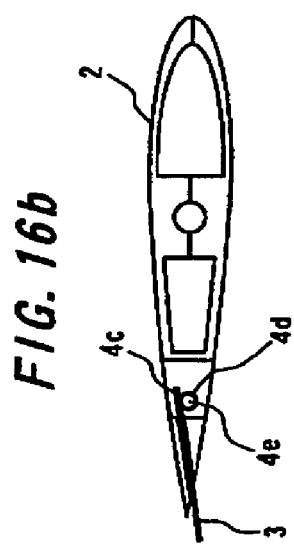
Figure 17:
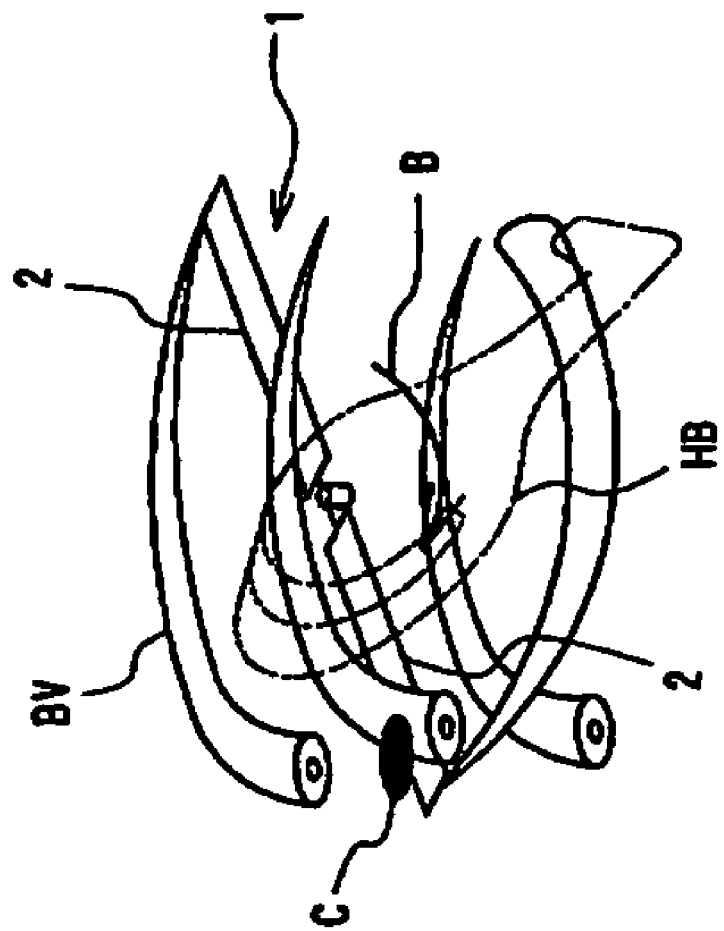
FIG. 17 is an illustration showing the condition in which the Blade Vortex Interaction (BVI) noise is generated.
Figure 18A:
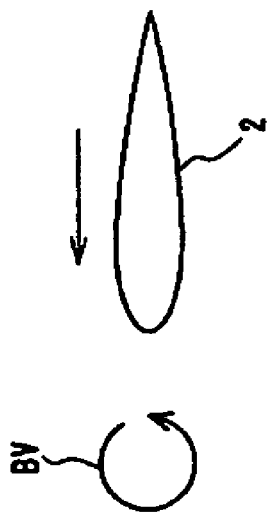
FIG. 18 (a) is an illustration showing the positional relationship between the blade tip vortex and the rotor blade before the rotor blade enters the blade tip vortex, and FIG. 18 (b) is an illustration showing pressure distribution on the top surface of the blade in the positional relationship described in FIG. 18 (a).
Figure 18B:
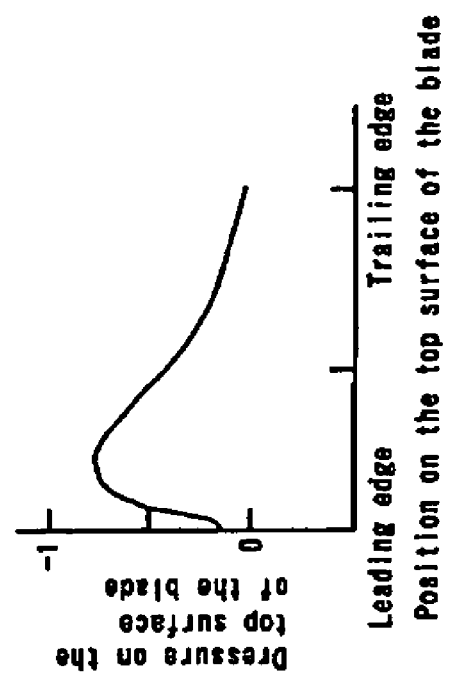
Figure 19A:
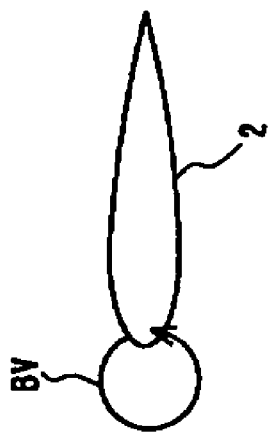
FIG. 19 (a) is an illustration showing the positional relationship between the blade tip vortex and the rotor blade when the rotor blade enters the blade tip vortex, and FIG. 19 (b) is an illustration showing pressure distribution on the top surface of the blade in the positional relationship described in FIG. 19 (a).
Figure 19B:
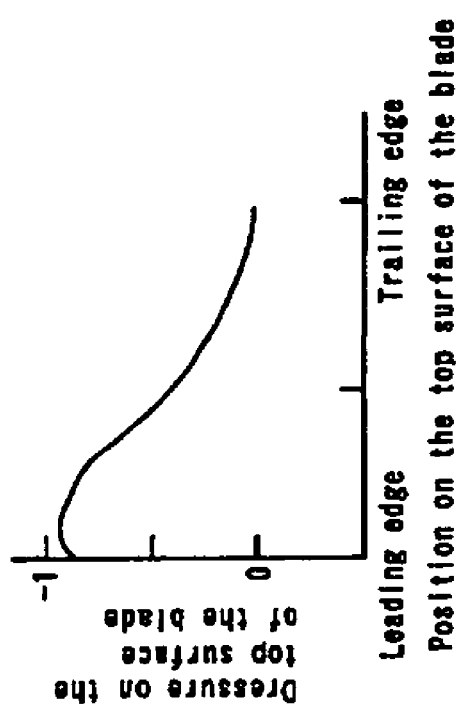

FIG. 13 is a perspective view of configuration of the actuator of yet another embodiment of the BVI noise reduction apparatus according to the present invention. FIG. 14 is a plane view showing configuration of the BVI noise reduction apparatus of the embodiment described above. FIG. 15 is a cross-sectional view of the rotor blade taken along line E-E of FIG. 14. FIG. 16 (*a*) is a cross-sectional view of the rotor blade taken along line F-F of FIG. 14 in the state in which the tab is retreated the most, and FIG. 16 (*b*) is a cross-sectional view of the rotor blade taken along line F-F of FIG. 14 in the state in which the tab is advanced the most. The BVI noise reduction apparatus of this embodiment, unlike the embodiment shown in FIG. 8, the tab 3, which is not fan-shaped but rectangular, is pivoted to the rotor blade 2 by the supporting axis 11 to swing.

In addition, according to the BVI noise reduction apparatus of this embodiment, like the variation described above, the actuator 4 has a rack 4*c* coupled into the tab 3 by a pin and a transmission shaft 4*e* which has a pinion 4*d* engaged into the rack 4*c* and which extends from the base to the tip in longitudinal direction of the rotor blade 2 and which is pivoted to the rotor blade 2 and a linkage 4*f* which is in conjunction with, for example, a swash plate and set around the drive shaft 7 and works as a control device and rotates the transmission shaft 4*e* so that the tab advances and retreats in response to rotating timing of the rotor blade.

According to the BVI noise reduction apparatus of another embodiment, the linkage 4*f* works in conjunction with a swash plate, rotates the transmission shaft 4*e*, for example, by moving a lever at the end of the transmission shaft 4*e*, in response to rotating timing of the rotor blade 2, and advances and retreats the tab 4 in response to rotating timing of the rotor blade 2. Therefore, electric system is unnecessary for the control device, so the configuration of the BVI noise reduction apparatus can be extremely simplified.

The present invention is not to be limited to the embodiments described and illustrated above. For instance, according to the present invention, the pressure sensor 9 and CPU 5*a* may be omitted and the generator 6 may work also as a control device. Also, electric power may be supplied directly from the rotor coils 6*a* to the actuator 4, or through a drive amplifier, and the actuator may be advanced and retreated by phase change of output electricity of the coils 6*a*.

In addition, according to the present invention, the tab 3 may advance and retreat from a trailing edge of the rotor blade 2 to the rear, diagonally outward with respect to the radial direction of the rotating center of the rotor blade 2. Thus, pressing force given to the rollers 2*a* from the tab 3 with centrifugal force of the rotating rotor blade 2 when the tab 3 advances and retreats can be reduced, guiding force of the tab 3 can be reduced.

Further, according to the present invention, the tab 3 may be placed at a position where the tab protrudes from a tailing edge of the rotor blade 2, with the tab 3 and the trailing edge of the rotor blade 2 apart from one another. Thus, with lift force increasing, the tab 3 may be lighter, its inertia force reduced, driving force of the actuator 4 smaller, and the actuator lighter and more compact.

Furthermore, according to the present invention, for example, lift force of the rotor blade 2 may be fine-adjusted by shortening the protruding length of the tab 3, for example, by energizing some of the electromagnets 4*a* or by stop energizing some of them. Also, instead of using the electromagnets 4*a* and the steel plate 3*a*, an electromagnetic solenoid may be used, and the core loosely inserted into the coil may be advanced and retreated.

In addition, the tab of the present invention can not only reduce the BVI noise but also adjust lift force of each of the rotor blades instead of a flap provided in each of the rotor blades and can restrain the vibration of the rotor system. Also, it can longer prevent air current from breaking away from each of the rotor blades and enhance operation efficiency of the rotor system.

INDUSTRIAL APPLICABILITY

According to this BVI noise reduction method and apparatus for a helicopter, an actuator provided in the rotor system including the rotor blade is operated to increase lift force of the rotor blade by advancing a tab to a position where the tab protrudes from a trailing edge of the rotor blade and to decrease lift force back to the former condition by retreating the tab to a position where the tab does not protrude from the trailing edge of the rotor blade. Thus, interaction between the blade tip vortex and the rotor blade can be moderated by locally changing height of the rotor blade, and the BVI noise can be reduced.

In addition, not so much control force is required for advance and retreat of the tab from the trailing edge of the rotor blade with respect to the rear of the rotating direction, the actuator to operate the tab can be configured to be small enough to be set in the rotor system, and high response of the tab can be easily achieved.

The invention claimed is:
1. A method for reducing blade vortex interaction of blades of a helicopter rotor, comprising:
  pivoting a tab on the rotor blade from a retracted position in or on the blade, to an extended position wherein the tab extends outwardly from a trailing edge of the blade, and wherein the pivot axis is at a non-zero angle to the horizontal plane of the rotor blade moving the tab back to the retracted position; and controlling movement of the tab using an actuator attached to the tab, with the actuator controlled based on rotation timing of the rotor.

2. The method of claim 1 further comprising generating electrical power via rotation of the rotor and supplying the electrical power to the actuator.

3. The method of claim 2 wherein the rotor blade is a first rotor blade and the rotor also further comprises a second rotor blade having a second tab and a second actuator, and wherein the second actuator moves the second tab to avoid a blade tip vortex generated by the first rotor blade, based on the rotation timing of the rotor, which is detected from a phase of the electric power generated from the generator.

4. The method of claim 1 wherein the amount of tab movement is controlled based on an output signal from a pressure sensor provided in a leading edge of the rotor blade.

5. The method of claim 1 wherein the tab is provided in the rotor blade so that it can pivot around the pivot axis between a second position where the tab protrudes from the trailing edge of the rotor blade and a first position where the tab is withdrawn into the trailing edge of the blade, and with the pivot axis extending at a non-vertical angle to the plane of the blade, with an upper end of the pivot axis closer to the trailing edge of the blade than a lower end of the pivot axis.

6. A blade vortex interaction noise reduction apparatus for a helicopter, comprising:

a tab on a blade of a rotor of the helicopter, with the tab pivotable between a second position where the tab protrudes from a trailing edge of the rotor blade and a first position where the tab does not protrude from the trailing edge of the rotor blade, and where the pivot axis forms a non-zero acute angle $\alpha$ with a horizontal plane through the blade, an actuator in or on the rotor blade and connected to the tab; and a control device linked to the actuator and operating the actuator so that the tab moves in response to rotation timing of the rotor.

7. The blade vortex interaction noise reduction of claim 6 further including a generator associated with a drive shaft of the rotor, the generator providing electric power generated by rotation of the drive shaft, to the actuator.

8. The blade vortex interaction noise reduction of claim 6 wherein the tab is adjacent to a tip of the rotor blade.

9. The blade vortex interaction noise reduction apparatus of claim 6 wherein the tab can swing around the pivot axis between a position where the tab protrudes from a trailing edge of the rotor blade and a position where the tab does not, and can advance and retreat with respect to the rear of the rotating direction of the rotor blade, with an upper end of the pivot axis closer to the trailing edge of the blade than a lower end of the pivot axis, and with the tab pivotable around the pivot axis.

10. The blade vortex interaction noise reduction apparatus of claim 9 wherein the tab is fan-shaped having a wider end and a narrower end and the tab is positioned on the rotor blade with the wider end towards the tip of the blade and with a pivot pin the pivot axis located through between the wider end and the narrower end attaching the tab to the rotor blade.

11. The blade vortex interaction noise reduction apparatus of claim 10 wherein the actuator is attached to the tab adjacent to the narrower end of the tab.

12. The blade vortex interaction noise reduction apparatus of claim 10 further comprising a counterweight at the narrower end of the tab.

13. The blade vortex interaction noise reduction of claim 9 wherein the pivot axis is not perpendicular to the plane of the rotor blade, so that the tab moves out of the plane of the blade as the tab is extend out from the trailing edge of the blade.

14. The blade vortex interaction noise reduction apparatus of claim 6 with the actuator comprising:

a rack coupled with the tab;

a transmission shaft having a pinion engaged into the rack and which extends from a base to a tip of the rotor blade and which is pivotally supported by the rotor blade; and a linkage associated with the rotor shaft so that the tab advances and retreats in response to rotating timing of the rotor blade.

15. A blade vortex interaction noise reduction apparatus for reducing noise of a helicopter having a rotor including a first blade and a second blade, comprising:

a first tab pivotally attached to the first blade at a first tab pivot attachment pin, the first tab pivot attachment pin oriented at a first rearwardly inclined angle relative to the first blade, with the first tab pivotally moveable from a first position wherein the first tab at least partially protrudes at a first angle from a trailing edge of the first blade, and a second position wherein the first tab does not substantially protrude from the trailing edge of the first blade;

a second tab pivotally attached to the second blade at a second tab pivot attachment pin, the second tab pivot attachment pin oriented at a second rearwardly inclined angle relative to the second blade with the second tab pivotally moveable from a first position wherein the second tab at least partially protrudes at a second angle from a trailing edge of the second blade, and a second position wherein the second tab does not substantially protrude from the trailing edge of the second blade;

a first actuator on the first blade and attached to the first tab, for moving the first tab between the first and second positions;

a second actuator on the second blade and attached to the second tab, for moving the second tab between the first and second positions; and an actuator controller linked to the first and second actuators, and controlling operation of the actuators in coordination with rotation of the rotor.

16. The apparatus of claim 15 with the tabs having a sector shape.

17. The apparatus of claim 15 with the tabs having an outer end and an inner end, and with the inner end narrow than the outer end.

18. The apparatus of claim 15 with the tabs each having an outer end and an inner end, and with each pivot axis attachment pin located between the outer end and the inner end.

19. The apparatus of claim 15 further comprising a counterweight on the inner end of each of the tabs, and with each pivot axis attachment pin between the counterweight and the outer end.

* * * * *